United States Patent [19]

Severini et al.

[11] Patent Number: 5,498,052

[45] Date of Patent: Mar. 12, 1996

[54] SEAT HINGE AND LATCH ASSEMBLY WITH BI-DIRECTIONAL RELEASE

[75] Inventors: Joseph A. Severini, Holland Landing; Daniel C. L. Yee, Richmond Hill, both of Canada; Omar D. Tame, West Bloomfield, Mich.; Shelly M. Plaza, Fraser, Mich.; Noel P. Gravenstruter, Clarkston, Mich.; Dragi Jovan, Farmington Hills, Mich.; Thomas J. Susko, Eastpoint, Mich.; Steven A. Schulte, Novi, Mich.

[73] Assignees: Atoma International, Inc., Newmarket, Canada; Chrysler Corporation, Auburn Hill; Lear Seating Corporation, Southfield, both of Mich.

[21] Appl. No.: 368,818

[22] Filed: Jan. 6, 1995

Related U.S. Application Data

[63] Continuation of Ser. No. 958,748, Oct. 9, 1992, abandoned.

[30] Foreign Application Priority Data

Feb. 25, 1994 [JP] Japan ........................ 6-27881

[51] Int. Cl.⁶ .................................................. B60N 1/02
[52] U.S. Cl. .................... 296/65.1; 297/14; 297/324; 411/141
[58] Field of Search ................... 296/65.1, 63; 297/14, 297/316, 324, 340; 411/141, 145

[56] References Cited

U.S. PATENT DOCUMENTS

| | | | |
|---|---|---|---|
| 3,059,964 | 10/1962 | Hoppe et al. | 296/65.1 X |
| 3,522,970 | 8/1970 | Francis | 296/65.1 X |
| 4,266,822 | 5/1981 | Barecki et al. | 296/65.1 |
| 4,527,828 | 7/1985 | Groce et al. | 296/65.1 |
| 4,771,507 | 9/1988 | Draplin et al. | 296/65.1 X |
| 4,793,649 | 12/1988 | Yamano et al. | 296/65.1 |
| 4,955,973 | 9/1990 | Provencher | 296/65.1 |

*Primary Examiner*—Joseph D. Pape
*Attorney, Agent, or Firm*—Cushman, Darby & Cushman

[57] ABSTRACT

A vehicle seat comprises a seat back cushion assembly having a lower end and an upper end, and a seat cushion assembly having one end adjacent the lower end of the seat back assembly and an opposite end. A mounting structure is provided and is constructed and arranged with respect to the upper end of the seat back cushion assembly to mount the same so that the upper end does not move appreciably in a horizontal direction but can have limited vertical movement. A releasably lockable mounting assembly is constructed and arranged to be mounted on a floor of a vehicle and to be connected with the seat cushion and seat back cushion assemblies in a relationship which retains the one end of the seat cushion assembly adjacent the lower end of the seat back cushion assembly while enabling the assemblies to be selectively releasably moved between two locked positions consisting of (1) a sitting position wherein the seat cushion assembly extends generally horizontally from the one end thereof to the opposite end thereof to support a user sitting thereon and the seat back cushion assembly extends upwardly from the lower end thereof to the upper end thereof to support the back of a user sitting on the seat cushion assembly and (2) a storage position wherein the seat back cushion assembly extends generally vertically and the seat cushion assembly extends generally vertically in adjacent relation alongside the seat back cushion assembly. A cable assembly is operable remote from the releasably lockable mounting assembly to release the releasably lockable mounting assembly to permit movement thereof between the sitting and storage positions.

23 Claims, 8 Drawing Sheets

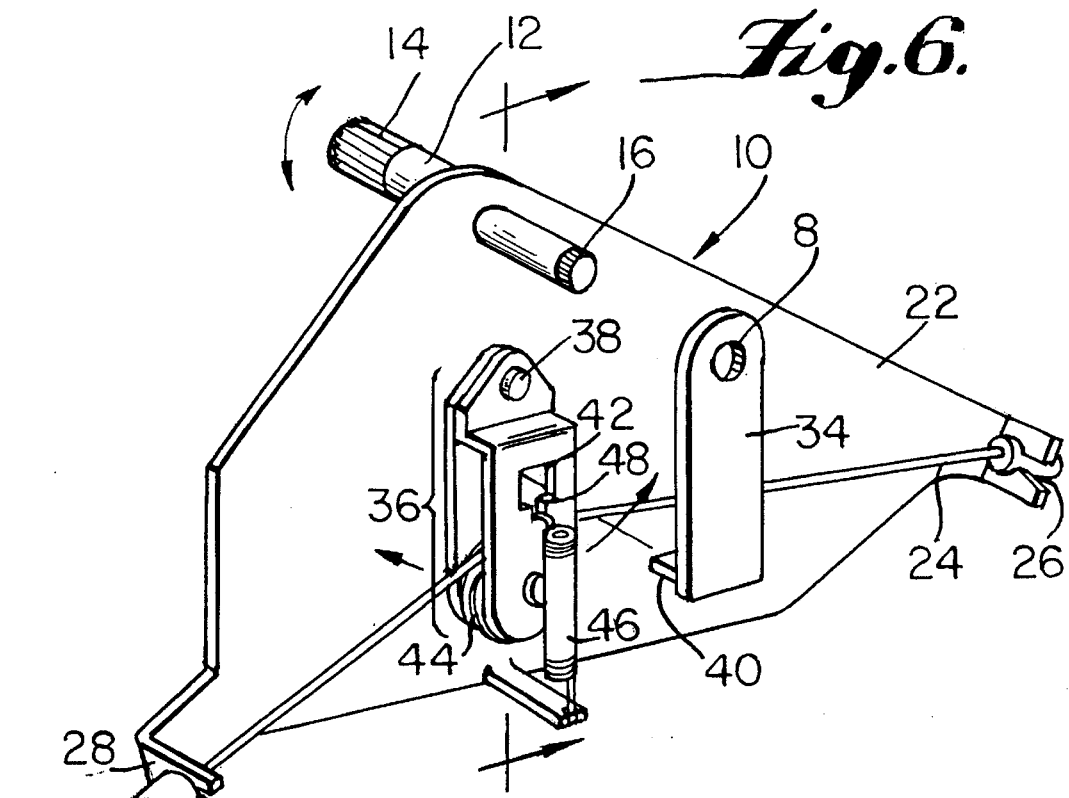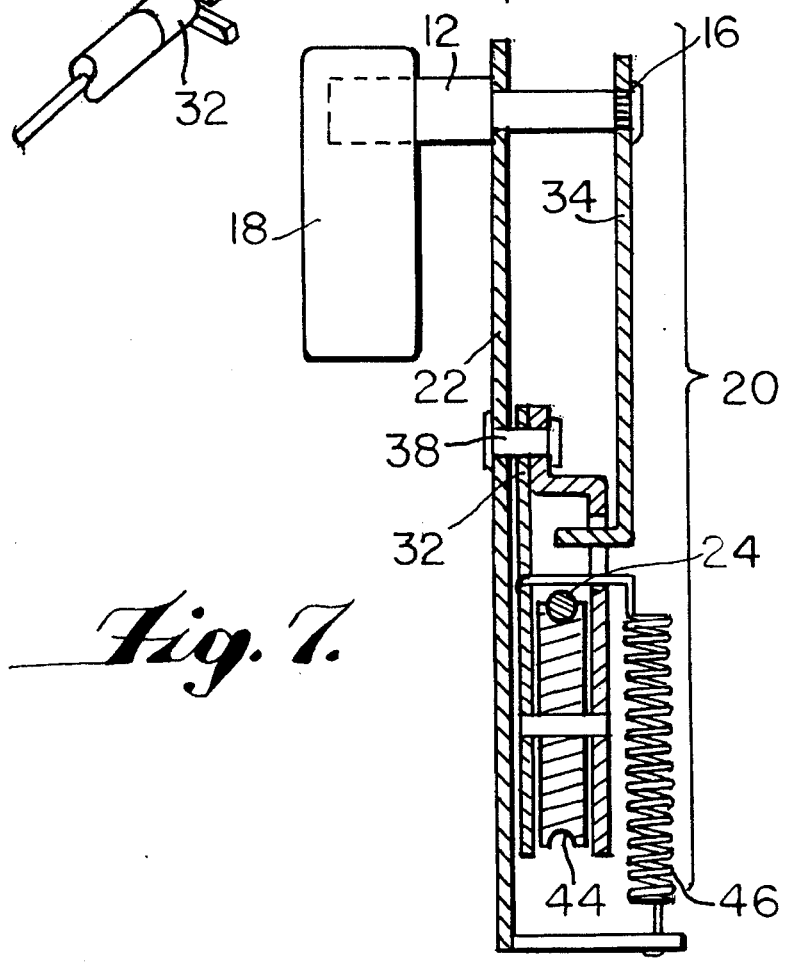

1

SEAT HINGE AND LATCH ASSEMBLY WITH BI-DIRECTIONAL RELEASE

This application is a Continuation of U.S. patent application 07/958,748 filed Oct. 9, 1992, which is now abandoned.

FIELD OF INVENTION

This invention relates to vehicle seats, and more particularly to seats which can be moved between a sitting position and a storage position to allow more cargo space in the vehicle.

BACKGROUND OF THE INVENTION

It is known in the prior art to provide a pivoting seat, which pivots and locks with respect to a seat back. An example of such a seat is U.S. Pat. No. 4,793,649. As best seen in FIG. 2 of the drawings of the '649 patent, the assembly of the '649 patent requires supplementary pawl and detente members 28a and 30 which complicate the structure. It would be advantageous if the latching positions were defined with the mounting bracket and the pawl mounted with the seat bracket to simplify the assembly. Further, the seat back and the seat are attached to the assembly with separate brackets and therefore there is no provision for the interrelationship of the movements thereof.

It is also known to provide a release for seats, hood-latches, trunks or the like which operates by turning a handle in a predetermined direction. For seats specifically, it would be advantageous to operate the release handle in either direction to release and move the seat.

Known latch structures and specifically the pawls thereof wear over time and, as a result, introduce rattles and other unpleasant noises into the operation thereof. Thus, there exists a need to provide a latching member with a wear resistant design which accommodates the many latching cycles thereof by wearing in a predetermined manner to ensure cooperation of the parts through the extended life thereof.

None of the prior art provides a simplified latch assembly which reduces the number of parts for a pivoting seat without sacrificing reliability. It would be therefore cost effective and efficient if a latch were available which includes detentes defined with the mounting bracket, and which may be engageable by a pawl having a predetermined geometry along with the detente to compensate for cycled wear. Finally it would also be beneficial to provide the assembly with a bi-directional release to simplify operation of seat assemblies.

SUMMARY OF THE INVENTION

It is therefore an object of the invention to provide a vehicle seat that has a seat cushion which can be moved between a seating position and a storage position, and which meets the needs described above. The vehicle seat of the present invention comprises a seat back cushion assembly having a lower end and an upper end, and a seat cushion assembly having one end adjacent the lower end of the seat back assembly and an opposite end. A mounting structure is provided and is constructed and arranged with respect to the upper end of the seat back cushion assembly to mount the same so that the upper end does not move appreciably in a horizontal direction but can have limited vertical movement. A releasably lockable mounting assembly is constructed and arranged to be mounted on a floor of a vehicle and to be connected with the seat cushion and seat back cushion assemblies in a relationship which retains the one end of the seat cushion assembly adjacent the lower end of the seat back cushion assembly while enabling the assemblies to be selectively releasably moved between two locked positions consisting of (1) a sitting position wherein the seat cushion assembly extends generally horizontally from the one end thereof to the opposite end thereof to support a user sitting thereon and the seat back cushion assembly extends upwardly from the lower end thereof to the upper end thereof to support the back of a user sitting on the seat cushion assembly and (2) a storage position wherein the seat back cushion assembly extends generally vertically and the seat cushion assembly extends generally vertically in adjacent relation alongside the seat back cushion assembly. In addition, a cable assembly is operable remote from the releasably lockable mounting assembly to release the releasably lockable mounting assembly to permit movement thereof between the sitting and storage positions.

It is yet a further object of the invention to provide a pawl and detente for a latch which compensates for the wear over time and reduces the amount of freeplay which is introduced into a latch as the latch wears. To accomplish this object, the present invention provides pawl pivotally mountable with respect a predetermined pivot point and adapted for engagement with a substantially u-shaped detente means. The detente means has arcuately shaped side walls defined by arcs of a circle, each arc having a radius of different length and a different center. The pawl has a mounting portion for pivotally mounting the pawl with respect to a predetermined pivot point and a substantially u-shaped tooth portion which has a front wall and arcuately shaped side walls, compatible with the detente sidewalls, that converge toward the front wall. The u-shaped tooth portion is dimensioned so that at least a portion of the pawl sidewalls engage the corresponding detente sidewalls. The pawl tooth sidewalls are shaped according to a pattern defined by arcs of circles having opposite radii lengths relative to the radii lengths defining the shape of the corresponding detente side walls and the same centers as those defining the shape of the corresponding detente walls. The radii length used to define the shape of the pawl tooth sidewalls being substantially the same as the radii lengths used to define the shape of the opposite detente sidewalls.

It is yet a further objective of the invention to provide a bi-directional actuator for releasing a lockable releasing assembly, which allows the vehicle seat to be releasably locked in two positions. To accomplish this objective, the present invention provides a vehicle seat comprising a first mounting assembly constructed and arranged to be mounted on a floor of the vehicle. A seat cushion assembly is carried by the first mounting assembly, and a seat back cushion assembly has a lower end adjacent the seat cushion assembly and an opposite end. A second mounting assembly is connected with the seat back cushion assembly and is constructed and arranged to maintain the seat back cushion assembly in operative relation with respect to the seat cushion assembly. One of the mounting assemblies includes a releasable locking assembly releasable to permit movement of one of the mounting assemblies and the cushion assembly associated therewith between two releasably locked positions. In addition, a manually operable cable assembly is provided and is operable to release the releasable locking assembly to permit movement of the mounting assembly and associated cushion assembly between the two locked positions. The cable assembly includes (i) a support structure; (ii) a flexible cable connected at one end with the releasable locking assembly and movable so that the one end thereof moves in one direction to release the releasable locking assembly; (iii) a cable moving member mounted on the support structure and movable in two opposite directions. The moving member is constructed and arranged to move the one end of the cable in the one direction to release the releasable locking assembly in response to movement thereof in either of the two directions; and (iv) a manually movable member mounted on the support structure and constructed and arranged to be manually moved to effectuate movement of the cable moving member in either of the two directions to move the one end of the cable in the one direction to release the releasable locking assembly and thereby permit the mounting assembly and associated cushion assembly to be moved between the two locked positions.

In another aspect of the present invention, this last mentioned objective is accomplished by provided a vehicle seat comprising a seat back cushion assembly having a lower end and an upper end, and a seat cushion assembly having one end adjacent the lower end of the seat back assembly and an opposite end. A releasably lockable mounting assembly is constructed and arranged to be mounted on a floor of a vehicle and to be connected with the seat cushion and seat back cushion assemblies in a relationship which retains the one end of the seat cushion assembly adjacent the lower end of the seat back cushion assembly while enabling the assemblies to be selectively releasably moved between two locked positions consisting of (1) a sitting position wherein the seat cushion assembly extends generally horizontally from the one end thereof to the opposite end thereof to support a user sitting thereon and the seat back cushion assembly extends upwardly from the lower end thereof to the upper end thereof to support the back of a user sitting on the seat cushion assembly and (2) a storage position wherein the seat back cushion assembly and the seat cushion assembly extend generally vertically in adjacent relation alongside one another. In addition, a cable assembly is provided and is operable remote from the releasably lockable mounting assembly to release the releasably lockable mounting assembly to permit movement thereof between the sitting and storage positions. The cable assembly includes (i) a support structure; (ii) a flexible cable connected with the lockable mounting assembly and being movable to release the lockable mounting assembly and thereby permit the lockable mounting assembly to be moved between the sitting and storage positions; (iii) a cable moving member mounted on the support structure and movable in two opposite directions, the moving member being constructed and arranged to move the cable to release the lockable mounting assembly in response to movement thereof in either of the two directions; and (iv) a manually movable member mounted on the support structure and constructed and arranged to be manually moved to effectuate movement of the cable moving member in either of the two directions to move the cable to release the lockable mounting assembly.

Further objects of this invention will become apparent to one skilled in the art when considering the following summary of the invention and the more detailed description of the preferred embodiments illustrated herein.

BRIEF DESCRIPTION OF THE DRAWINGS

The invention will now be illustrated with respect to the following drawings illustrating embodiments of the invention in which:

FIG. 6 is a perspective view of a bi-directional actuator illustrated according to a preferred embodiment of the invention.

FIG. 7 is a side elevation of the bi-directional actuator of FIG. 6 shown in cross-section along the line 2—2 in FIG. 6.

DETAILED DESCRIPTION OF THE PREFERRED EMBODIMENTS OF THE INVENTION

Figure 1:
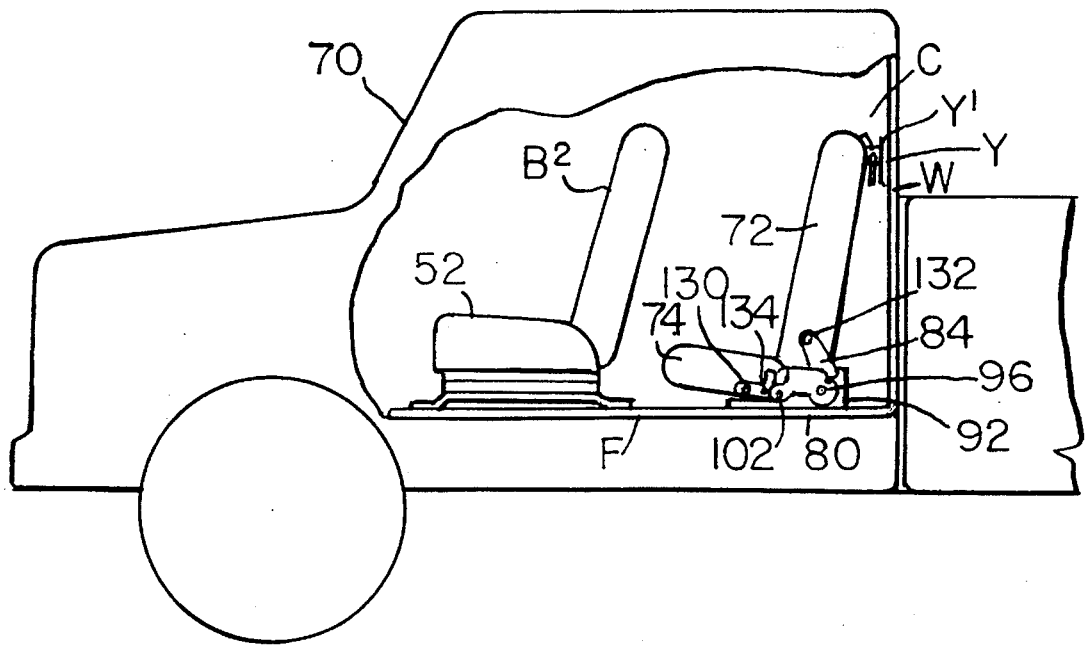
FIG. 1 is a schematic representation of a truck having a folding rear seat which folds from an operative position into a storage position and illustrated in a preferred embodiment of the invention.
Figure 2:
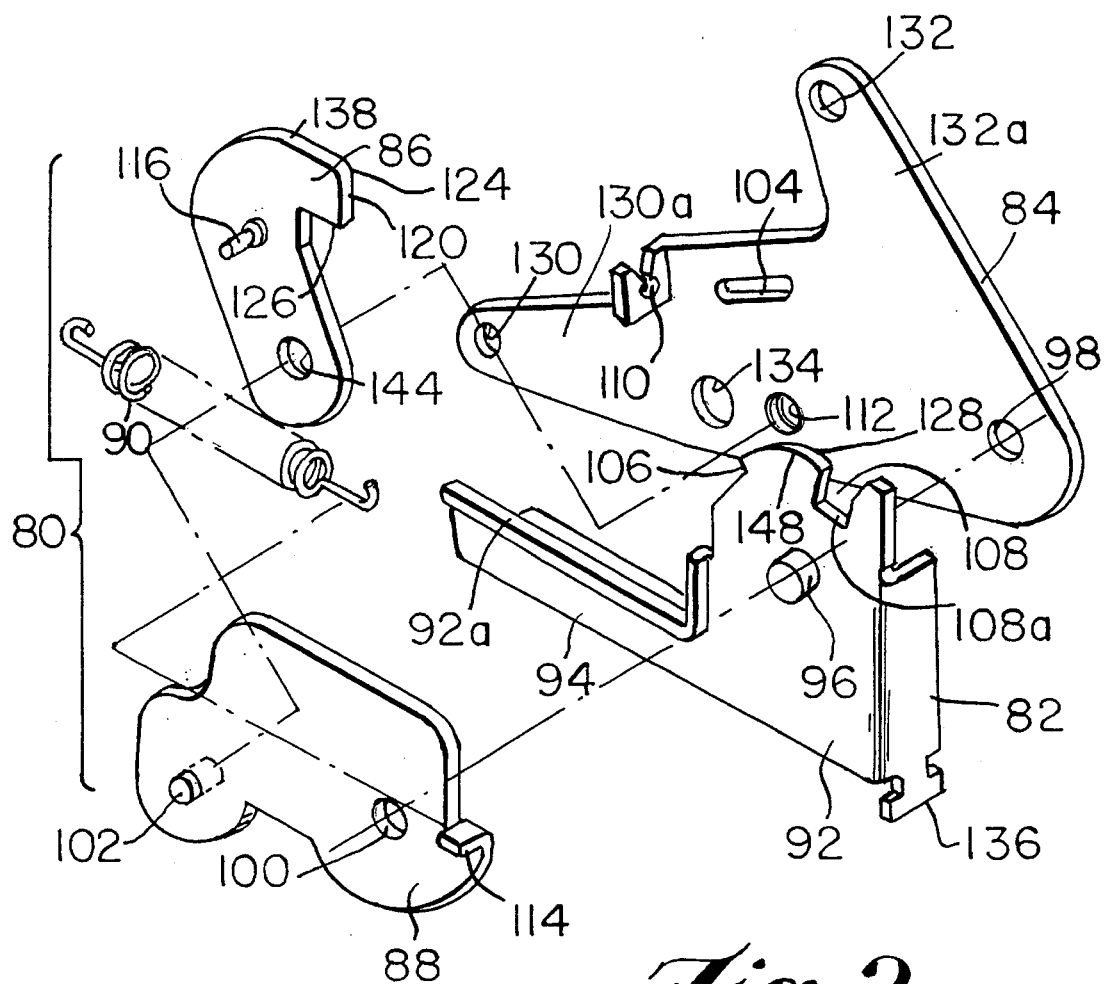
FIG. 2 is an exploded perspective view of a seat hinge and latch assembly illustrated in a preferred embodiment of the invention.
Figure 2A:
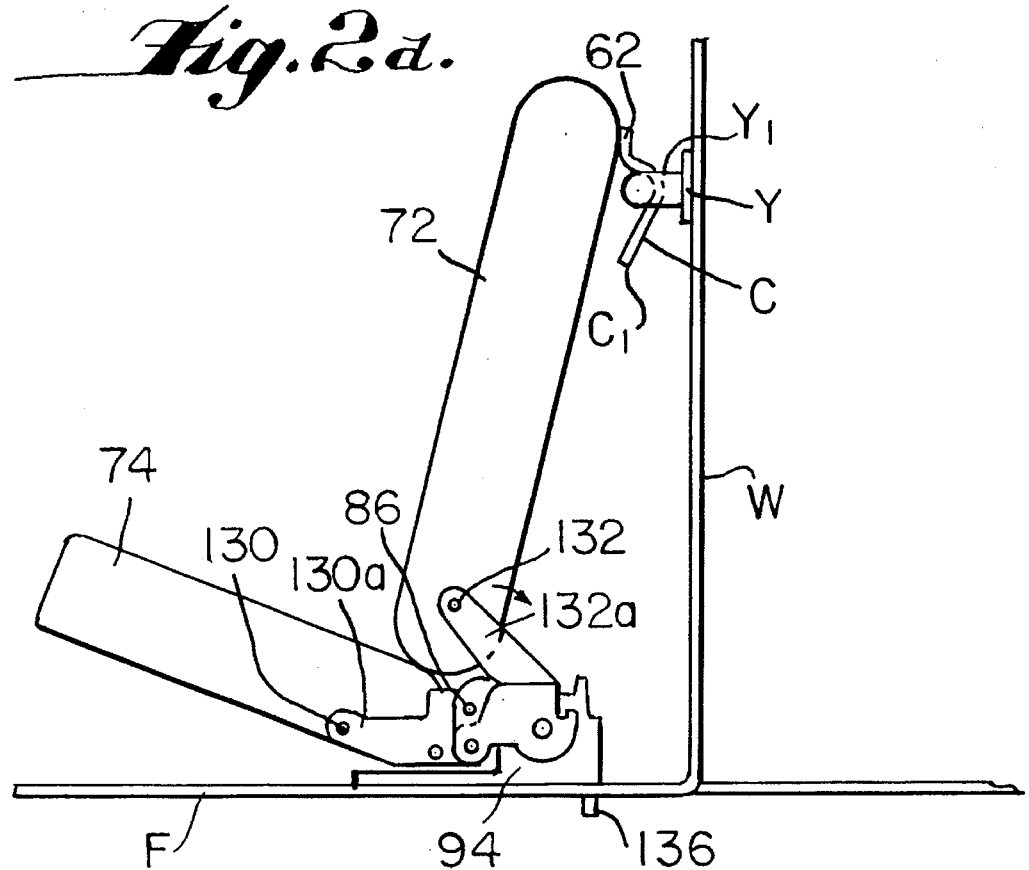
FIGS. 2A and 2B are side views of the seat of FIG. 1 illustrated in a preferred embodiment of the invention.
Figure 2B:
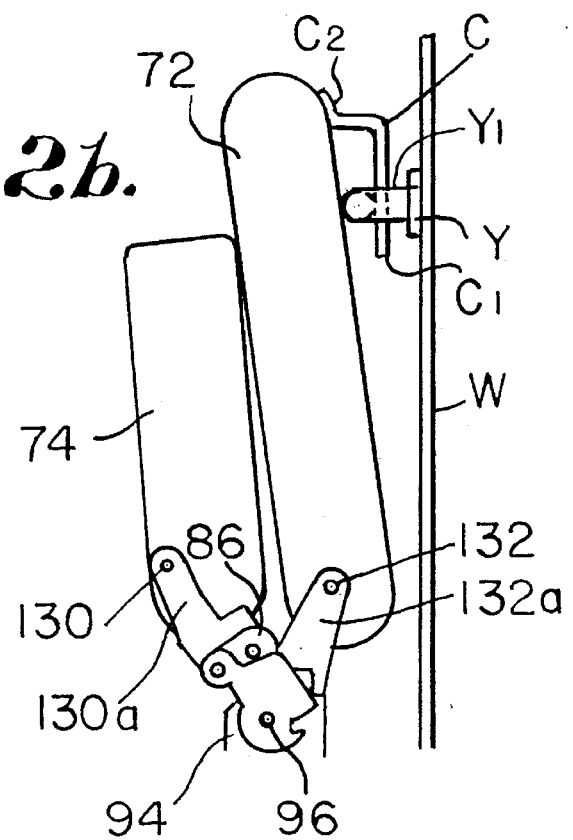
Figure 10:
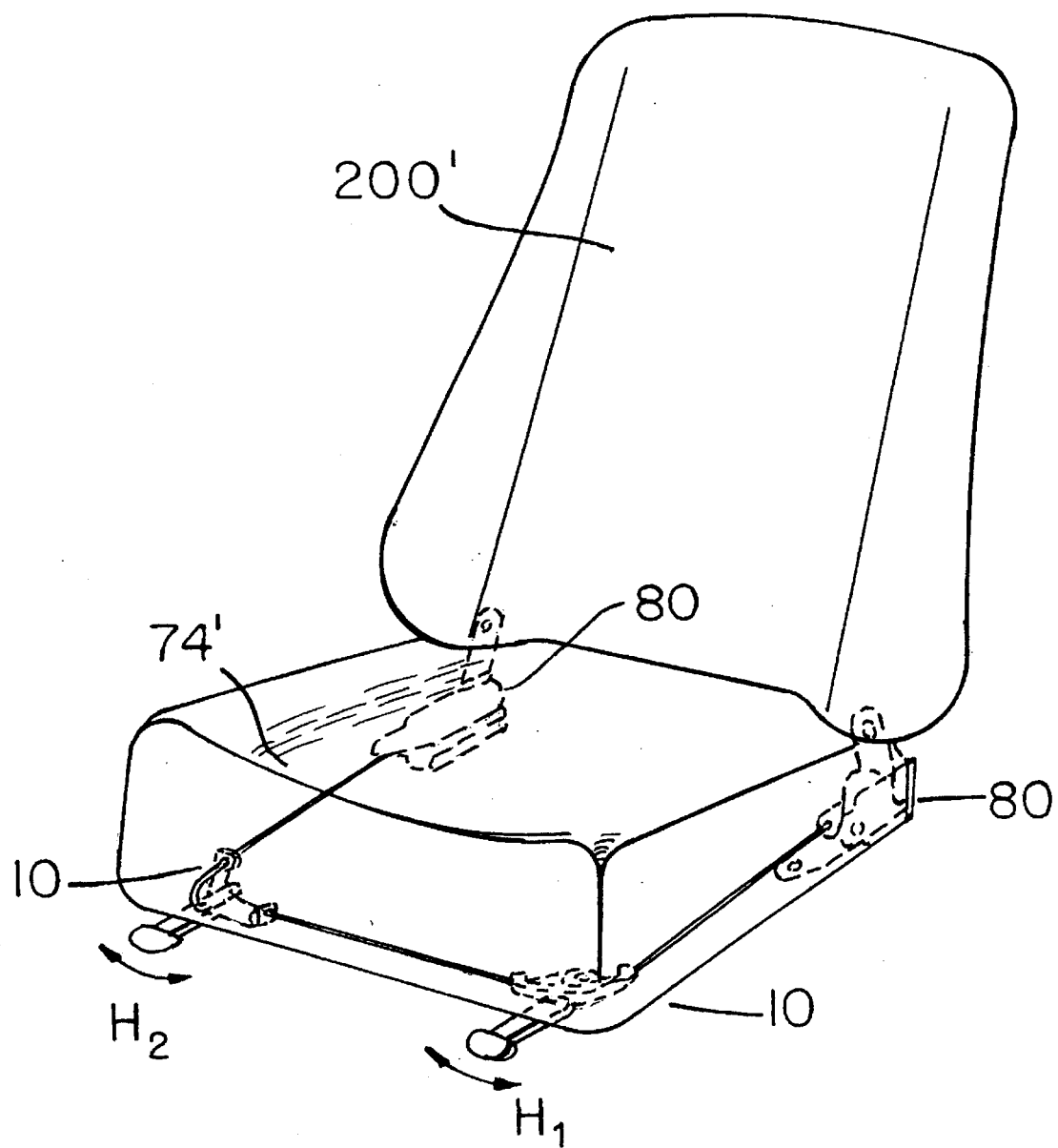
FIG. 10 is a schematic view of a seat containing many embodiments of the invention.

Referring now to FIG. 1, there is illustrated a pickup truck 70 which has a driver's seat S2 and seatback B2 installed in the cab thereof. Behind the seat is disposed a folding seat 74 which folds to and from operative and stored positions. A latch and hinge assembly 80 is therefore provided and fastened to the floor F by a bracket 92 as best seen in FIG. 2. The bracket 92 has positioning detentes, formed therewith to latch a releasable pawl 86 with respect thereto. The pawl 86 is affixed to a seat bracket 84 which is fixed to the seat 74 at 130 and 134 and pivotally to the seatback 72 at 132 to provide for motion of the bottom end of the seatback as illustrated in FIGS. 2A and 2B. The top of the seatback 72 is held in position by a clip C which engages a yoke Y and retains the seatback in position proximate the top thereof while the bottom moves rearwardly to allow for space for the folding of the seat 74. The pawl 86 is remotely releasable from the detente of the seat (as best seen in FIG. 10) allowing motion of the seat 74.

Figure 1B:
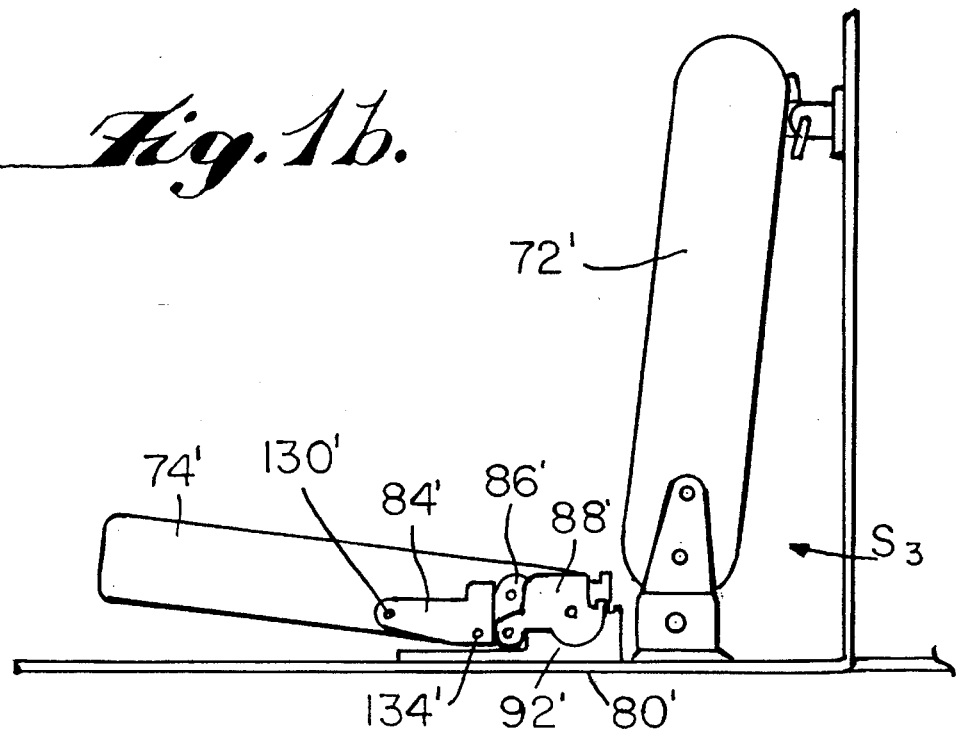
FIGS. 1A and 1B are schematic views illustrating alternative embodiments of the invention.
Figure 1A:
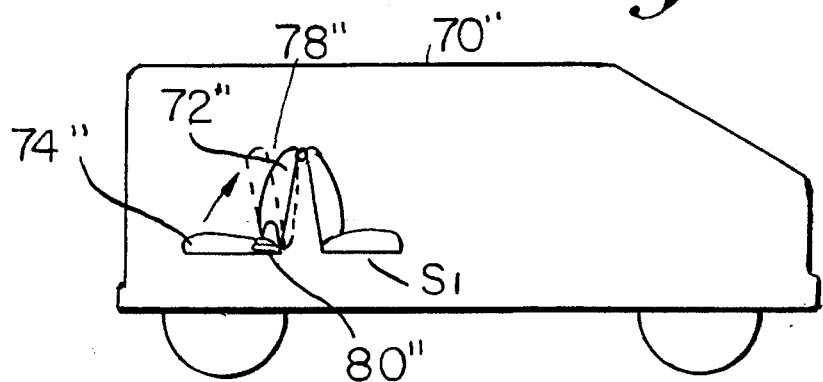

As shown in FIG. 1A, a seat hinge and latch assembly 80" according to an alternative embodiment of the invention is provided to control the motion of the seat cushion 74" of a rear seat 78" of van 70" to increase the storage space at the rear of the van. This is accomplished by rotating the seat cushion 74" from the operative position thereof to the folded position thereof against the seat back 72" as described above.

Referring now to FIG. 1B, there is illustrated in an alternative embodiment of the invention the seat 74' and seatback 72' defining a seat assembly S3 wherein the seat 74' moves independent of the seatback 72' and folds adjacent the back 72' by the latching and pivoting assembly 80'. The seat 74' is affixed to the seat bracket 84'. The pawl 86' is releasable with the detentes of mounting bracket 92'. There is no cooperative motion of the seatback 72' in this embodiment.

Figure 3:
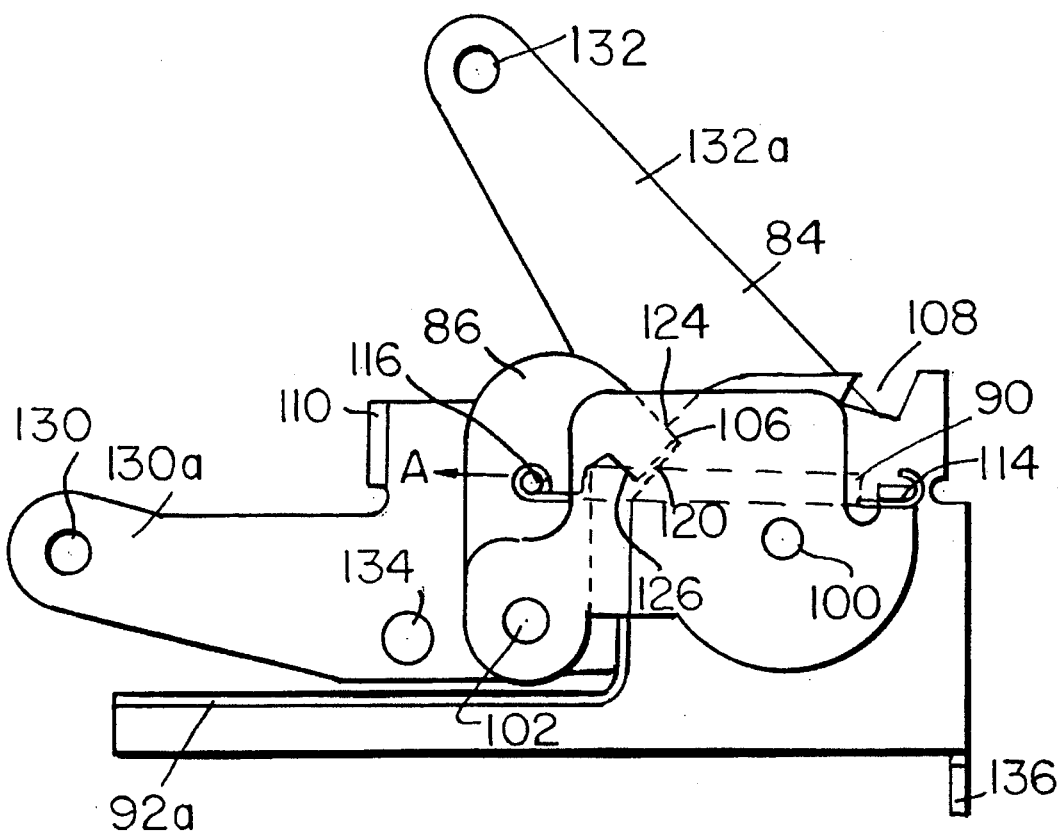
FIG. 3 is a front elevation of the seat hinge and latch assembly of FIGS. 2A and 2B illustrating the latch pawl positions for locking the seat in an operative position.
Figure 5:
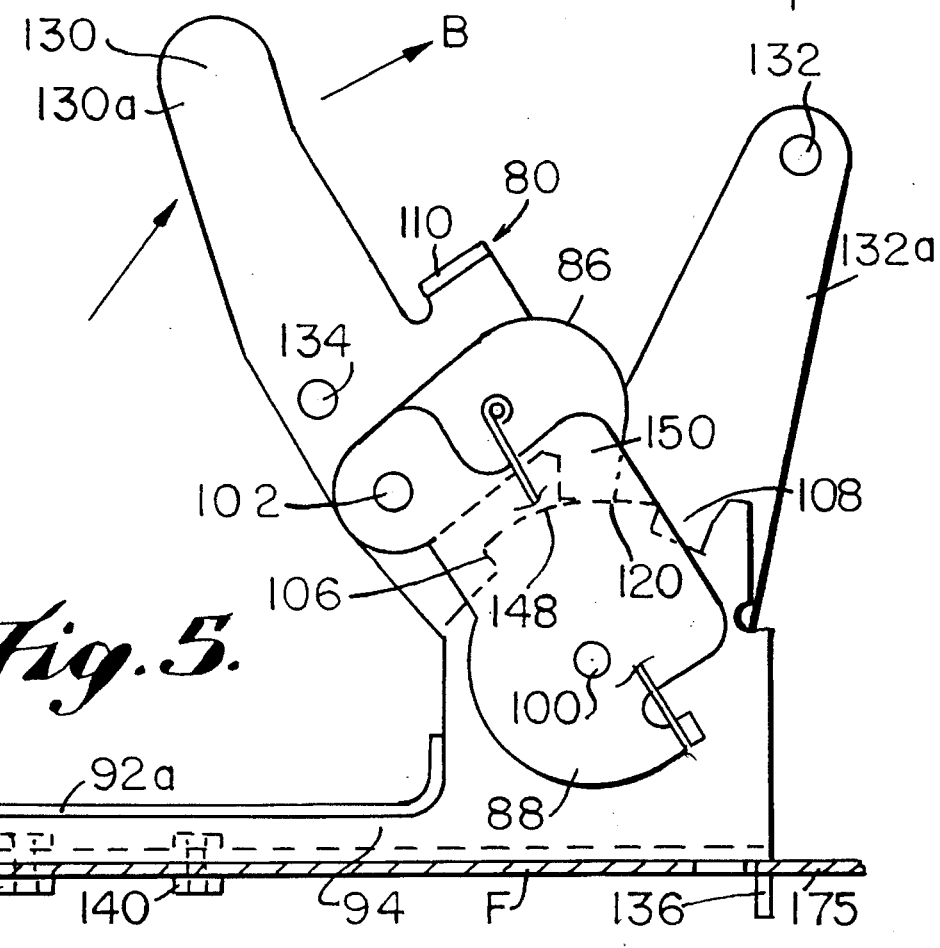
FIG. 5 is a front elevation of the seat hinge and latch assembly of FIG. 1 illustrating the assembly bolted to a vehicle floor and the motion of the second arm and the latch pawl when rotated into the storage position.

Referring now to FIGS. 2, 3 and 5, the seat hinge and latch assembly 80 includes the mounting bracket 82 for mounting to the vehicle for attachment to the seat bracket 84 by a pivot pin 96 which is received by aperture 98. Stabilizing plate 88 is also mounted about pivot pin 96 to provide a space within which the pawl 86 will move and to provide lateral stability to the assembly 80. The stabilizing plate 88 is able to rotate with the seat bracket 84 and pawl 86. The latch pawl is pivotally mounted for rotation with the seat bracket at and stabilizing plate 88 through pivot pin 102 which extends from the stabilizing plate 88 through an aperture in the latch pawl 144 and aperture 112 in the seat bracket 84. The stabilizing plate 88 thereby sandwiches the latch pawl 86 against the seat bracket 84 and stabilizes the movement of the bracket mounted to the mounting bracket 82 to provide lateral stability to the hinge and latch mechanisms.

A biasing means in the form of a spring 90 attached to pin 116 on latch pawl 86 and hook portion 114 on stabilizing plate 88 biases the latch pawl 86 towards the detente portions 106 and 108 located on the mounting bracket 82. Pin 116 extends through the latch pawl (not shown) to ride in slot 104 to define limits of the path of travel of the latch pawl. Apertures 130 disposed in seat bracket arm 130a, and 134 on seat bracket 84 provides the means for attachment to the seat cushion 74. Cable guide means and stop means 110 is provided to align and support the interconnecting cable (not shown), extending along a predetermined path of travel from a latch release (one example thereof being shown in FIG. 10) to the latch pawl pin 116 extending from the latch pawl thereby providing a point of attachment for the cable.

As best seen in FIGS. 3 and 5, the latch pawl 86 engages detente 106 located in the upper portion of the mounting bracket 82 to prevent rotation of the seat bracket 84 when the seat 74 is in the lower operative position. When the latch pawl 86 is pulled in direction A to disengage detente portion 106, the latch pawl can travel along the upper surface 148 of the mounting bracket 82 as the seat 74 is being folded into a storage position as best seen in FIG. 2B. Referring again to FIG. 5, it will be seen that detente portion 108 located in the mounting bracket 82 is positioned for locking the latch pawl when the seat bracket 84 carries the seat cushion to the fully folded position.

As can be seen in relation to FIGS. 2A and B, the seat 74 is attached as described above to seat bracket 84 proximate end 130a. The seat back 72 is also secured to the seat bracket at arm 132a. The point 132 therefore provides a point of attachment to seatback 72 as well as a pivot point to allow the end of the seatback to move as the seat 74 is folded. The top of seatback 72 is retained in position by a Z shaped clip C having 2 ends C1 and C2. End C2 is preferably welded to the seatback. End C1 is clipped over a yoke Y1 fixed to wall W of the vehicle. The clip end C1 is resilient in nature to retain the top of the seatback 72 in position as the seatback bottom moves downwardly and toward the rear to compensate for the space required for the pivoting seat 74. Therefore as the seat 74 is folded the lower end of seat back 72 moves toward the rear to wall W to allow space for the seat 74 to reach the stored position.

Figure 4:
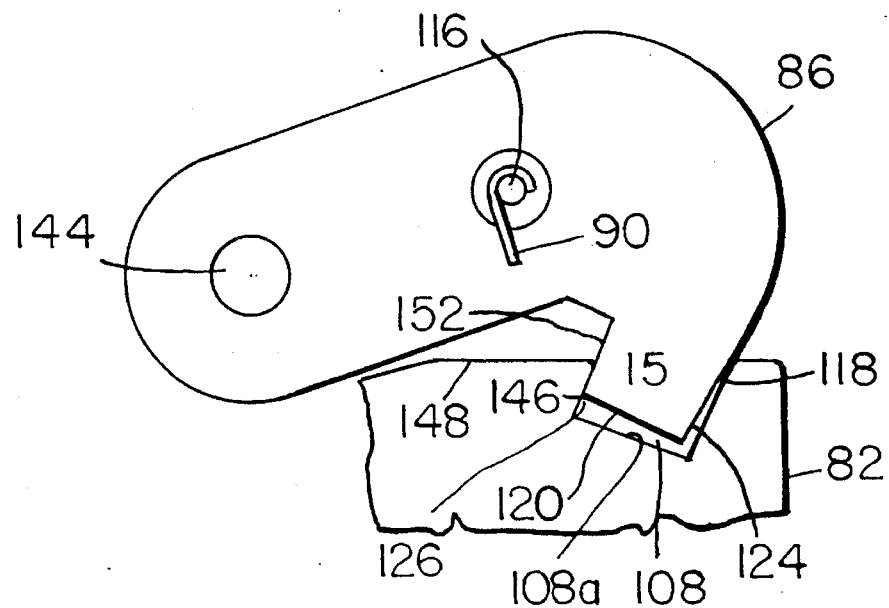
FIGS. 4 and 4A are close-up schematic views of the latch pawl of FIG. 3 illustrating the design of the wear characteristics of the pawl and detente.

As best seen in FIG. 4, the tooth portion of 150 of the latch pawl 86 tapers towards the leading edge 120 of the tooth portion 150. The leading edge 120 is also angled so that the trailing corner 126 of the tooth portion 150 does not come into contact with surface 108a of the mounting bracket when the latch pawl is rotated into detente 108. The primary points of contact of the tooth portion 150 with detente 108 occurs at surface 118 extending from a leading corner 124 of the tooth portion 150 and the trailing corner 126 of pawl 86. A gap therefor is provided near the bottom of detente 108 which gap will become smaller over time, thus resulting in the edge 120 of pawl 86 slowly coming closer to bottom 108a of detente 108 over time. Therefore, as the tooth 150 wears it will tend to better engage the detente 108. As shown in FIG. 4, the wear on the latch pawl 86 does not therefore effect its engagement with the detente portion 108. The edge 146 of the detente means 108 is arcuate to minimize wear of corner 126, and trailing surface 152 of the detente portion is rounded to also minimize the wear of corner 126. The corner 126 descends into detente 108 and comes into contact with surface 146 of the detente means 108 which surfaces of the tooth portion are under minimum wear because of the smooth arcs provided with surfaces 146, 118, 126 and 124 (which is described in detail in relation to FIG. 4A).

Figure 4A:
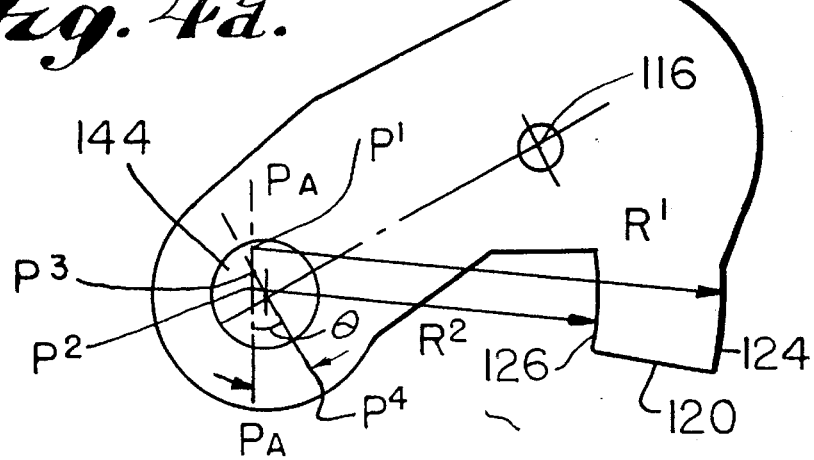

Referring to FIG. 4A, there is illustrated the pawl 86 pivoting on pivot P4 and provided with a pin 116 to be attached to a cable for actuation of the pawl. The geometry of the tooth 150 and detente 108 therefore are defined by arc lengths R1 from point P1 for surface 124 of tooth 150 and R2 from point P2 for surface 126 of tooth 150 selected to converge towards the bottom of the detente 108a. The points P1 and P2 are selected as offset by 1.5 mm from point P3. Point P3 is located by offsetting 6.3 mm from P4 to ensure that the resultant arcs are not concentric with P4 and drawings a line at theta degrees (which angle is approximate of the angle at which the tooth 150 is established estimated to be 25 degrees) from the horizontal passing through point P3. To ensure the smooth mating of the detente surfaces 146 and 118 the arcs R1 and R2 are reversed so that R2' is established form P1' and R1' is established from P2'.

As seen in FIGS. 6 and 7 the actuator 10 is provided with support bracket 22 in the form of a plate for supporting the engaging portion 20. The engaging portion 20 includes a first member 34 pivotally attached to the support 22 by connector 12 which has pinion like ends 14 and 16 for rotatable connection to an operating handle and the engaging means respectively. The engaging portion 20 is provided with an aperture 8 which has compatible interior walls for cooperation with the end of connector 16. The engaging portion provides a lever assembly including a first member 34 attached to the connector as described above and a second member 36 extending from the first member which pivots separately therefrom at 38. The first member 34 is linked to the second member 36 for articulation therewith by a link end 40 which moves member 36 when member 34 is moved. Member 36 also has disposed near its end remote member 34 a roller 44 for engagement with the cable 24. The roller is pivotably mounted to the member 36 through pivot pin 6. The member 34 includes a tooth like link 40 which is slidably mounted within a guide slot 42 located on the face of the second member 36. The second member 36 is pivotably mounted to the support 23 in a second pivot position by pivot pin 38 which is located between the first pivot position 16 and the position of the tooth 40. This will cause the tooth to ride downward along guide means 42 when the unit is operated. A biasing spring 46 extends from bracket 4 to the back plate 2 of the second member 36. The spring 46 serves to bias the lever means into a fully extended inoperative position as described below in reference to FIG. 8. The support bracket 22 is provided with eyelet 28 and 30 for supporting the cable in position for engagement along a predetermined path. As best seen in FIG. 6 a cable mounting pin 26 is affixed to one end of the cable and supports this end of the cable in a fixed position. On the other end cable sleeve 32 attached to eyelet 28 provides a guide for slidably supporting the cable. In this arrangement the cable can be deflected to alternative paths as the handle is operated which causes the roller 44 to adopt position 54 depending on which way the handle is operated. The motion of the roller 44 serves to move the end of the cable proximal to the latch mechanism towards the bi-directional actuator since the cable moves out of its normal path to a second path 56 causing the free end of the cable attached to the pawl as seen in FIG. 10 to move towards the release mechanism and thereby unlatch the pawl.

Reference to FIG. 10 also illustrates that the same cable may be threaded through two bi-directional actuators so that either but not both bi-directional actuators may be used to operate both latch mechanisms. Each bi-directional actuators is provided with a preferred operating means in the form of a handle 18.

Figure 8:
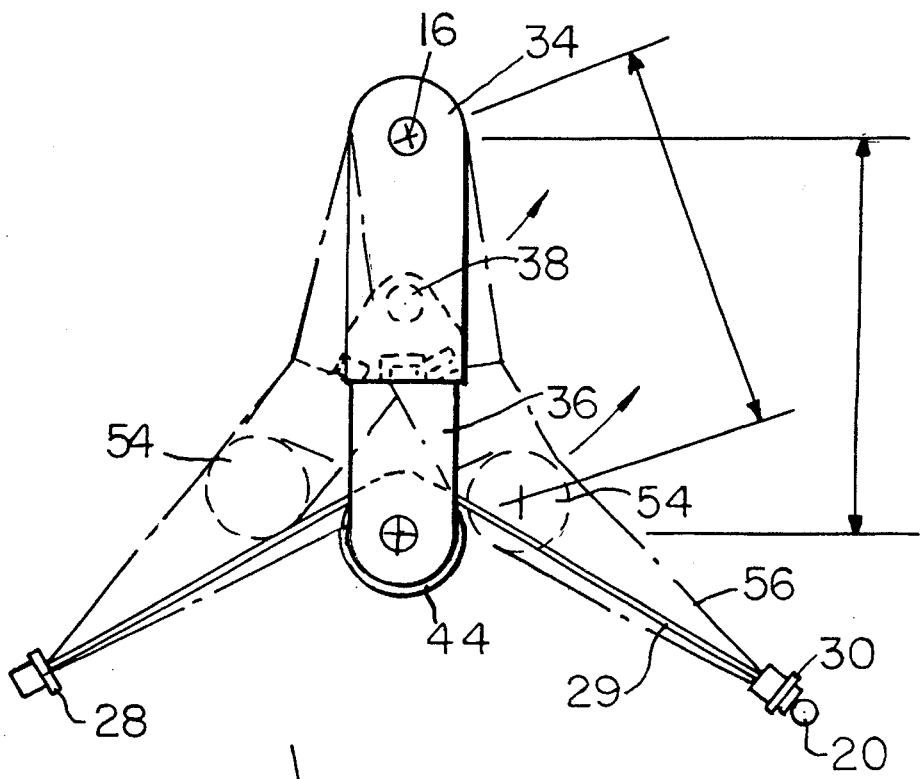
FIG. 8 is a schematic view of the engaging portions of the actuator of FIG. 6 shown in the inoperative and operative positions illustrating bi-directional actions thereof and illustrated in a preferred embodiment of the invention.

As best seen in FIG. 8 rotation of the actuator to operative positions on either side of the fully extended inoperative position causes the cable to be deflected along an alternate path which serves to draw the end of the cable proximal to the latch means towards the bi-directional actuator. It will be appreciated that a bi-directional actuator embodying the invention can be used to actuate any remotely actuated device wherein the bi-directional aspect proves advantageous. The two operative positions are shown in FIG. 8.

Figure 9:
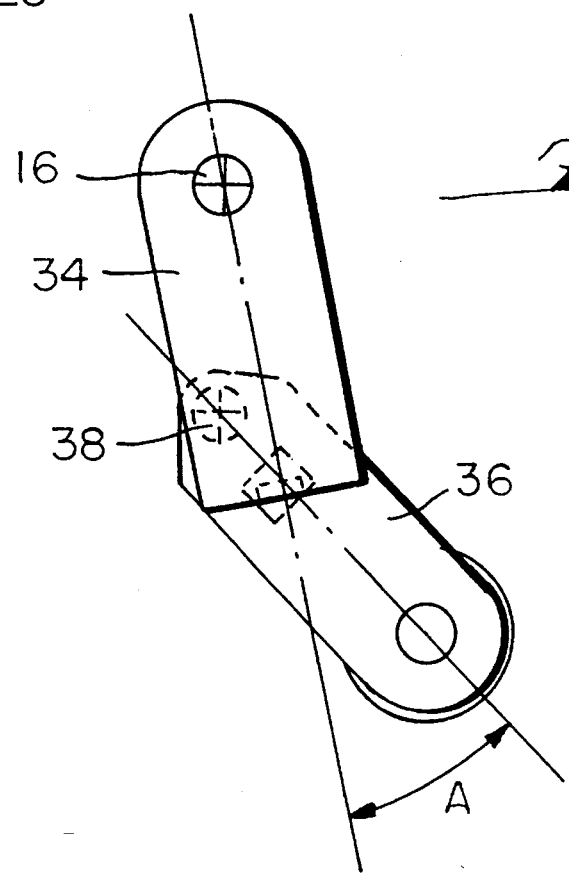
FIG. 9 is a diagrammatic representation of the engaging portions of FIG. 6 illustrating the articulation of the first and second members of the levers to increase the arc of rotation of the engaging means.

As best seen in FIG. 9, rotation of the member 34 causes displacement of the second member 36 into angular relationships with first member 34 and causes rotation of the roller 44 over a distance A. This increased arc of rotation allows increased displacement of the cable 24 which allows in one embodiment the bi-directional actuator to simultaneously operate two latch pawls when the cable is suitably tensioned as best seen in FIG. 10.

As seen in FIG. 8 the distance between this first pivot 16 and the point of engagement with the cable 24 decreases when the roller 44 is rotated into the operative positions due to the motion of the roller as seen in FIG. 8 in the operative positions. The tooth 30 is designed to cooperate with the slot 42 which tooth 30 will ride along the slot 42 to compensate for the shortened distance.

As many changes can be made to the invention without departing from the scope of the invention, it is intended that all material contained herein by interpreted as illustrative of the invention and not in a limiting sense.

What is claimed is:

1. A pawl pivotally mountable with respect a predetermined pivot point and adapted for engagement with a substantially u-shaped detente means, said detente means having arcuately shaped side walls defined by arcs of a circle, each arc having a radius of different length and a different center, the pawl having a mounting portion for pivotally mounting the pawl with respect to a predetermined pivot point and a substantially u-shaped tooth portion which has a front wall and arcuately shaped side walls, compatible with the detente sidewalls, that converge toward the front wall, the u-shaped tooth portion dimensioned so that at least a portion of the pawl sidewalls engage the corresponding detente sidewalls, the pawl tooth sidewalls being shaped according to a pattern defined by arcs of circles having opposite radii lengths relative to the radii lengths defining the shape of the corresponding detente side walls and the same centers as those defining the shape of the corresponding detente walls, the radii length used to define the shape of the pawl tooth sidewalls being substantially the same as the radii lengths used to define the shape of the opposite detente sidewalls.

2. A vehicle seat comprising:

a seat back cushion assembly having a lower end and an upper end;

a seat cushion assembly having one end adjacent the lower end of said seat back assembly and an opposite end;

a mounting structure constructed and arranged with respect to said upper end of said seat back cushion assembly to mount the same so that said upper end does not move appreciably in a horizontal direction but can have limited vertical movement;

a releasably lockable mounting assembly constructed and arranged to be mounted on a floor of a vehicle and to be connected with said seat cushion and seat back cushion assemblies in a relationship which retains the one end of said seat cushion assembly adjacent the lower end of said seat back cushion assembly while enabling said assemblies to be selectively releasably moved between two locked positions consisting of (1) a sitting position wherein said seat cushion assembly extends generally horizontally from said one end thereof to the opposite end thereof to support a user sitting thereon and said seat back cushion assembly extends upwardly from the lower end thereof to the upper end thereof to support the back of a user sitting on said seat cushion assembly and (2) a storage position wherein said seat back cushion assembly and said seat cushion assembly extend generally vertically in adjacent relation alongside one another; and a cable assembly operable remote from said releasably lockable mounting assembly to release said releasably lockable mounting assembly to permit movement thereof between said sitting and storage positions.

3. A vehicle seat according to claim 2, wherein said cable assembly comprises:

a support structure;

a flexible cable connected with said lockable mounting assembly and being movable to release said lockable mounting assembly and thereby permit said lockable mounting assembly to be moved between said sitting and storage positions;

a cable moving member mounted on said support structure and movable in two opposite directions, said moving member constructed and arranged to move said cable to release said lockable mounting assembly in response to movement thereof in either of said two directions; and a manually movable member mounted on said support structure and constructed and arranged to be manually moved to effectuate movement of said cable moving member in either of said two directions to move said cable to release said lockable mounting assembly.

4. A vehicle seat as defined in claim 2, wherein said support structure is mounted on said seat cushion assembly.

5. A vehicle seat as defined in claim 2, wherein said mounting structure comprises a resilient member fixed to said seat back cushion assembly and adapted to be secured to a rear wall of the vehicle so that the upper end of the seat back cushion assembly does not move appreciably in the horizontal direction but can have limited vertical movement.

6. A vehicle seat as defined in claim 5, wherein said resilient member comprises a substantially Z-shaped clip adapted to be secured to a yoke fixed to the rear wall of the vehicle.

7. A vehicle seat as defined in claim 2, wherein said releasably lockable mounting assembly comprises a detente-type locking arrangement normally biased into a locking position to prevent movement of said mounting assembly between said sitting and storage positions, said locking arrangement being movable in response to remote operation of said cable assembly against said bias to an unlocking position to permit movement of said mounting assembly between said sitting and storage positions.

8. A vehicle seat according to claim 2, wherein
(i) when in the sitting position, the seat cushion assembly extends generally horizontally from said one end thereof to said opposite end with a slight upward inclination and said seat back cushion assembly extends upwardly from the lower end thereof to the upper end thereof with a slight horizontal inclination in the opposite direction, and
(ii) when in the storage position, the lower end of the seat back cushion assembly is displaced horizontally in said opposite direction to an extended position so that said seat back cushion assembly extends generally vertically without a significant horizontal inclination in said opposite direction and said seat cushion assembly extends generally vertically in adjacent relation alongside said seat back cushion assembly.

9. A vehicle seat comprising:
a seat back cushion assembly having a lower end and an upper end;
a seat cushion assembly having one end adjacent the lower end of said seat back assembly and an opposite end;
a releasably lockable mounting assembly constructed and arranged to be mounted on a floor of a vehicle and to be connected with said seat cushion and seat back cushion assemblies in a relationship which retains the one end of said seat cushion assembly adjacent the lower end of said seat back cushion assembly while enabling said assemblies to be selectively releasably moved between two locked positions consisting of (1) a sitting position wherein said seat cushion assembly extends generally horizontally from said one end thereof to the opposite end thereof to support a user sitting thereon and said seat back cushion assembly extends upwardly from the lower end thereof to the upper end thereof to support the back of a user sitting on said seat cushion assembly and (2) a storage position wherein said seat back cushion assembly and said seat cushion assembly extend generally vertically in adjacent relation alongside one another; and
a cable assembly operable remote from said releasably lockable mounting assembly to release said releasably lockable mounting assembly to permit movement thereof between said sitting and storage positions, said cable assembly including
(i) a support structure;
(ii) a flexible cable connected with said lockable mounting assembly and being movable to release said lockable mounting assembly and thereby permit said lockable mounting assembly to be moved between said sitting and storage positions;
(iii) a cable moving member mounted on said support structure and movable in two opposite directions, said moving member constructed and arranged to move said cable to release said lockable mounting assembly in response to movement thereof in either of said two directions; and
(iv) a manually movable member mounted on said support structure and constructed and arranged to be manually moved to effectuate movement of said cable moving member in either of said two directions to move said cable to release said lockable mounting assembly.

10. A vehicle seat according to claim 9, wherein said cable moving member comprises a movable structure pivotally mounted on said support structure for movement in said two opposite direction, said movable structure including a cable engaging portion and being pivotally movable in said two opposite directions to enable said engaging portion to engage said cable to thereby move said cable to release said lockable mounting assembly.

11. A vehicle seat according to claim 10, wherein said flexible cable is connected with said lockable mounting assembly and said movable structure of said cable moving member is constructed and arranged so that said engaging portion thereof moves into tensioning engagement with a portion of said cable between said ends to thereby move said cable to release said lockable mounting assembly.

12. A vehicle seat according to claim 11, wherein said cable engaging portion comprises a roller rotatably mounted on said movable structure, said roller constructed and arranged to rollingly engage said cable to thereby move said cable.

13. A vehicle seat as defined in claim 9, further comprising a mounting structure constructed and arranged with respect to said upper end of said seat back cushion assembly to mount the same so that said upper end does not move appreciably in a horizontal direction but can have limited vertical movement.

14. A vehicle seat as defined in claim 13, wherein said mounting structure comprises a resilient member fixed to said seat back cushion assembly and adapted to be secured to a rear wall of the vehicle.

15. A vehicle seat as defined in claim 9, wherein said support structure is secured to one side of said opposite end of said seat cushion assembly, and wherein said cable assembly further comprises:
a second support structure secured to a side opposite to said one side of said opposite end of said seat cushion assembly;
a second cable moving member mounted on said second support structure and movable in two opposite directions to move said cable to release said lockable mounting assembly in response to movement thereof in either of said two directions; and
a second manually movable member mounted on said second support structure and constructed and arranged to be manually moved to effectuate movement of said second cable moving member in either of said two directions to move said cable to release said lockable mounting assembly.

16. A vehicle seat comprising:
a first mounting assembly constructed and arranged to be mounted on a floor of the vehicle;
a seat cushion assembly carried by said first mounting assembly;

a seat back cushion assembly having a lower end adjacent the seat cushion assembly and an opposite end;

a second mounting assembly connected with said seat back cushion assembly and constructed and arranged to maintain said seat back cushion assembly in operative relation with respect to said seat cushion assembly;

one of said mounting assemblies including a releasable locking assembly releasable to permit movement of one of said mounting assemblies and the cushion assembly associated therewith between two releasably locked positions; and a manually operable cable assembly operable to release said releasable locking assembly to permit movement of the mounting assembly and associated cushion assembly between said two locked positions, said cable assembly including (i) a support structure;

(ii) a flexible cable connected at one end with said releasable locking assembly and being movable so that said one end thereof moves in one direction to release the releasable locking assembly;

(iii) a cable moving member mounted on said support structure and movable in two opposite directions, said moving member constructed and arranged to move said one end of said cable in said one direction to release said releasable locking assembly in response to movement thereof in either of said two directions; and (iv) a manually movable member mounted on said support structure and constructed and arranged to be manually moved to effectuate movement of said cable moving member in either of said two directions to move said one end of said cable in said one direction to release said releasable locking assembly and thereby permit the mounting assembly and associated cushion assembly to be moved between said two locked positions.

17. A vehicle seat as claimed in claim 16, wherein said first and second mounting assemblies are operatively connected with one another and comprise a releasably lockable mounting assembly constructed and arranged to be mounted on the floor of a vehicle and to be connected with said seat cushion and seat back cushion assemblies in a relationship which retains one end of said seat cushion assembly adjacent a lower end of said seat back cushion assembly while enabling said assemblies to be selectively releasably moved between said two releasably locked positions, said two releasably locked positions consisting of (1) a sitting position wherein said seat cushion assembly extends generally horizontally from said one end thereof to an opposite end thereof to support a user sitting thereon and said seat back cushion assembly extends upwardly from the lower end thereof to the upper opposite end thereof to support the back of a user sitting on said seat cushion assembly and (2) a storage position wherein said seat back cushion assembly and said seat cushion assembly extend generally vertically in adjacent relation alongside one another.

18. A vehicle seat as claimed in claim 17, wherein said cable assembly is operable remote from said releasably lockable mounting assembly to release said releasably lockable mounting assembly to permit movement thereof between said sitting and storage positions.

19. A vehicle seat as claimed in claim 18, wherein said cable moving member comprises a movable structure pivotally mounted on said support structure for movement in said two opposite directions, said movable structure including a cable engaging portion and being pivotally movable in said two opposite directions to enable said engaging portion to engage said cable to thereby move said cable to release said lockable mounting assembly.

20. A vehicle seat according to claim 19, wherein said flexible cable is connected with said lockable mounting assembly and said movable structure of said cable moving member is constructed and arranged so that said engaging portion thereof moves into tensioning engagement with a portion of said cable between said ends to thereby move said cable to release said lockable mounting assembly.

21. A vehicle seat as defined in claim 17, wherein said support structure is secured to one side of said opposite end of said seat cushion assembly, and wherein said cable assembly further comprises:

a second support structure secured to a side opposite to said one side of said opposite end of said seat cushion assembly;

a second cable moving member mounted on said second support structure and movable in two opposite directions to move said cable to release said lockable mounting assembly in response to movement thereof in either of said two directions; and a second manually movable member mounted on said second support structure and constructed and arranged to be manually moved to effectuate movement of said second cable moving member in either of said two directions to move said cable to release said lockable mounting assembly.

22. A vehicle seat as claimed in claim 16, wherein a second end of said cable is anchored to said support structure.

23. A vehicle seat as claimed in claim 16, wherein said first mounting is provided separately from said second mounting assembly, said second mounting assembly constructed and arranged to be mounted on the floor of the vehicle and connected with seat back cushion assembly so that seat back cushion assembly extends upwardly from the lower end thereof to the upper opposite end thereof to support the back of a user sitting on said seat cushion assembly;

said first mounting assembly including said releasable locking assembly releasable to permit movement of said first mounting assembly together with said seat cushion assembly between said two releasably locked positions consisting of (1) a sitting position wherein said seat cushion assembly extends generally horizontally from one end thereof to an opposite end thereof to support a user sitting thereon and (2) a storage position wherein said seat back cushion assembly and said seat cushion assembly extend generally vertically in adjacent relation alongside one another.

* * * * *